United States Patent [19]

Yeh

[11] Patent Number: 5,753,982

[45] Date of Patent: May 19, 1998

[54] APPARATUS FOR SUPPLYING POWER TO A PERIPHERAL DEVICE FROM COMPUTER SYSTEM

[75] Inventor: Shih-Ping Yeh, Tao-Yuan Hsien, Taiwan

[73] Assignee: Twinhead International Corp., Kaohsiung, Taiwan

[21] Appl. No.: 660,002

[22] Filed: Jun. 3, 1996

[51] Int. Cl.⁶ .................................................. H02H 1/00
[52] U.S. Cl. ........................... 307/139; 307/140; 307/125; 361/91; 361/111; 361/118
[58] Field of Search ............................ 307/116, 125, 307/126, 130, 131, 139, 140; 361/56, 91, 111, 118

[56] References Cited

U.S. PATENT DOCUMENTS

| | | | |
|---|---|---|---|
| 4,317,056 | 2/1982 | Alberts | 307/130 |
| 4,427,899 | 1/1984 | Bruns | 307/130 |
| 5,404,542 | 4/1995 | Cheung | 395/750 |
| 5,463,261 | 10/1995 | Skarda | 307/131 |
| 5,587,867 | 12/1996 | Kurasawa | 361/111 |

Primary Examiner—Richard T. Elms
Assistant Examiner—Peter Ganjian

[57] ABSTRACT

An apparatus for supplying power to a peripheral device of a computer directly from the system power supply is disclosed. An expansion interface connector or a standard interface connector is used for providing power to the peripheral device. Either one or two electronic switching devices control the supply of power to the interface connector. A voltage output line, a control line and a ground line are connected to three pins of the interface connector. The peripheral device has a matched connector comprising three pins corresponding to the three pins of the interface connector. The peripheral device can be powered up and in operation when it is connected to the interface connector. A short protection mechanism is provided to avoid damaging the computer system when the peripheral device is not connected.

10 Claims, 3 Drawing Sheets

APPARATUS FOR SUPPLYING POWER TO A PERIPHERAL DEVICE FROM COMPUTER SYSTEM

FIELD OF THE INVENTION

The present invention relates to an apparatus for supplying electrical power to a peripheral device of a computer system, and more specifically to an apparatus for supplying power directly from the computer system.

BACKGROUND OF THE INVENTION

In today's computer technology, a computer system relies on many peripheral devices for improving its efficiency, adding its functions, and completing its user interface. Both a desktop and a notebook computer provide several input/output (I/O) ports for connecting the peripheral devices, such as printers, CD-ROMs, and scanners. In general, the peripheral devices are connected to the I/O ports through cables. A separate power supply device including rectifiers and a transformer is used to provide electrical power to the peripheral devices. Because a notebook computer is designed to be light weight and portable, finding an appropriate electrical outlet in the working environment for its peripheral device is very often inconvenient or impossible.

In some designs of notebook computers, the positive and negative terminals of the computer power supply are extended to the keyboard connector of the computer. The power to the peripheral device can therefore be provided from the power extension on the keyboard connector with an additional power cable. However, requiring an additional cable is always cumbersome and inconvenient for a portable notebook computer that is designed to be carried around. In addition, there is little protection on the power extension. The computer system can easily be damaged if a foreign conductive object such as a metallic clipper or pin shorts the power extension or the additional power cable.

SUMMARY OF THE INVENTION

The present invention has been made to overcome the above-mentioned drawback in supplying power to a peripheral device of a computer system. The primary object of the invention is to provide an apparatus for supplying power to a peripheral device directly from the computer system. The second object of the invention is to provide a mechanism for protecting the power supply device from being short-circuited.

According to the present invention, the power to a peripheral device can be taken directly from an expansion interface connector or a standard I/O interface connector such as a parallel port or a serial RS-232 port. The peripheral device can be powered up and in operation as soon as it is connected to the interface connector. The power supply provided by the invention also has a short protection mechanism to avoid damaging the computer system when the peripheral is not connected.

The positive and negative (or ground) voltage lines of the system power supply of the computer are used to provide the power on the expansion interface connector of this invention. Before connecting the system power to the interface connector, an electronic switching device is included to protect the voltage lines from being short-circuited. An output voltage terminal and a control terminal are provided by the electronic switching device. The output voltage terminal is then connected to a power supplying pin on the expansion interface connector through a protection fuse. The control terminal and the ground line are also connected to a control pin and a ground pin on the interface connector respectively. Three corresponding pins on the matching connector of a peripheral device are designed to accept the power supplying pin, the control pin and the ground pin. On the connector of the peripheral device, the two pins corresponding to the control pin and the ground pin of the interface connectors are connected together.

According to the present invention, the electronic switching device is turned into an ON state because the ground pin and the control pin are shorted when the peripheral device connector is connected to the interface connector. The system power is supplied to the peripheral device through the electronic switching device. When the peripheral device is not connected, the electronic switching device is in an OFF state. Therefore, no power voltage exists on the power supplying pin of the interface connector.

The invention also applies to the standard interface connectors commonly used in a computer system. The current peripheral devices using standard interface connectors do not define pins for power supply. Unused pins, ground pin, or pins for signal lines can be used for supplying power from the system power supply. When a pin corresponding to a signal line is used, it is necessary to provide an additional electronic multiplexer switch for switching the pin between the power supply and the signal transmission.

Different peripheral devices usually use different interface connectors and configure pins on the interface connectors differently. This invention can be applied according to a specific need or configuration of the peripheral device to properly select interface connector pins for providing power to the peripheral device from the system power supply.

DETAILED DESCRIPTION OF THE PREFERRED EMBODIMENTS

The present invention provides an apparatus for supplying power to a peripheral device directly from the system power supply of a computer. Either an expansion interface connector or a standard interface connector is used to extend the internal system power supply to the peripheral device connected to the computer. Therefore, the peripheral device obtains power and begins operation by connecting to the appropriate interface connectors. The apparatus of this invention will be described with three different embodiments in the following.

Figure 1:
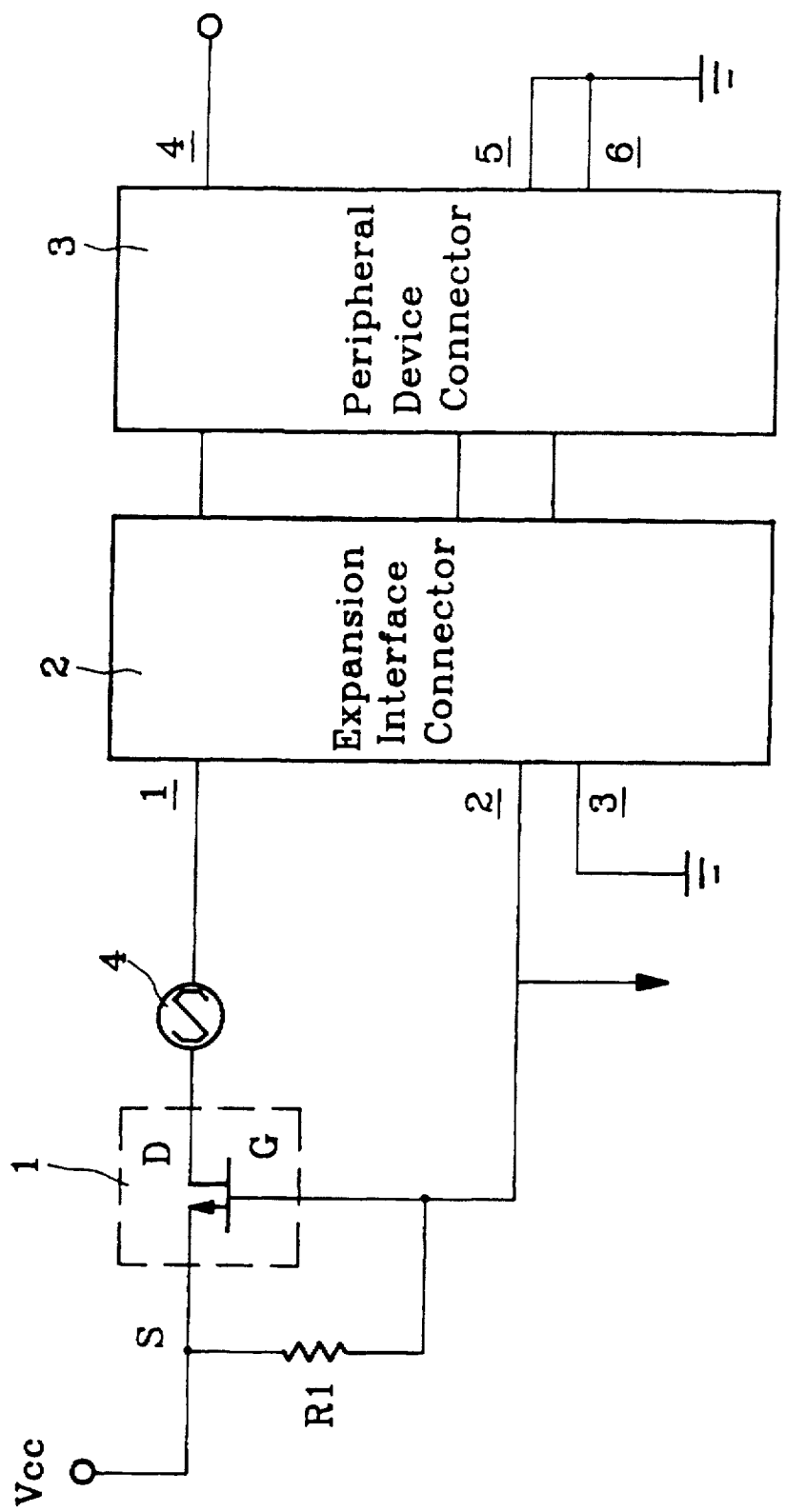
FIG. 1 is a preferred embodiment of the invention comprising an electronic switching device and an expansion interface connector.

FIG. 1 shows an embodiment of this invention comprising an expansion interface connector. As shown in the figure, the power supply Vcc is taken from the system power supply of the computer. The power supply Vcc is connected to an electronic switching device 1. The switching device can be any electronic device or circuit that is capable of performing ON and OFF switching function. The example shown in FIG. 1 is a P-MOSFET. When the voltage at the gate G of the P-MOSFET is high, the P-MOSFET is in an OFF state.

On the contrary, the current flows from the source to the drain of the P-MOSFET and it is in an ON state when the voltage at the gate is low.

The expansion interface connector 2 includes three pins for power supply line 1, control line 2 and ground line 3. The control line 2 is connected to the gate G of the P-MOSFET. The matching connector 3 on a peripheral device also includes three corresponding pins. Pin 4 that corresponds to pin 1 is the power input line of the peripheral device and pins 5 and 6 that correspond to pins 2 and 3 are used to control the voltage at pin 2. Pins 5 and 6 are connected together. As can be seen, when the peripheral device is connected to the expansion interface, the control line 2 is grounded. As shown in FIG. 1, a fuse 4 is used to connect the drain D of the P-MOSFET and the power supply line 1. The fuse 4 protects the computer from being damaged when there is any short circuit caused by abnormal system operation.

There is a resistor R1 between the power supply Vcc and the gate G of the P-MOSFET. When the computer is powered up and the peripheral device is not connected, the voltage at the gate G and the control line 2 is high because of the connection to the Vcc through the resistor R1. The P-MOSFET is in an OFF state. There is no risk of being short-circuited because no power supply voltage exists on the expansion interface connector.

When the peripheral device is connected to the expansion interface, the P-MOSFET is in an ON state because the gate G and the control line 2 are both grounded. The current flows from the source S to the drain D and allows the system power supply to provide power to the peripheral device. No additional cable or external power supply is required for the peripheral device. In addition, the peripheral device can be connected to the computer without powering down the system.

Figure 2:
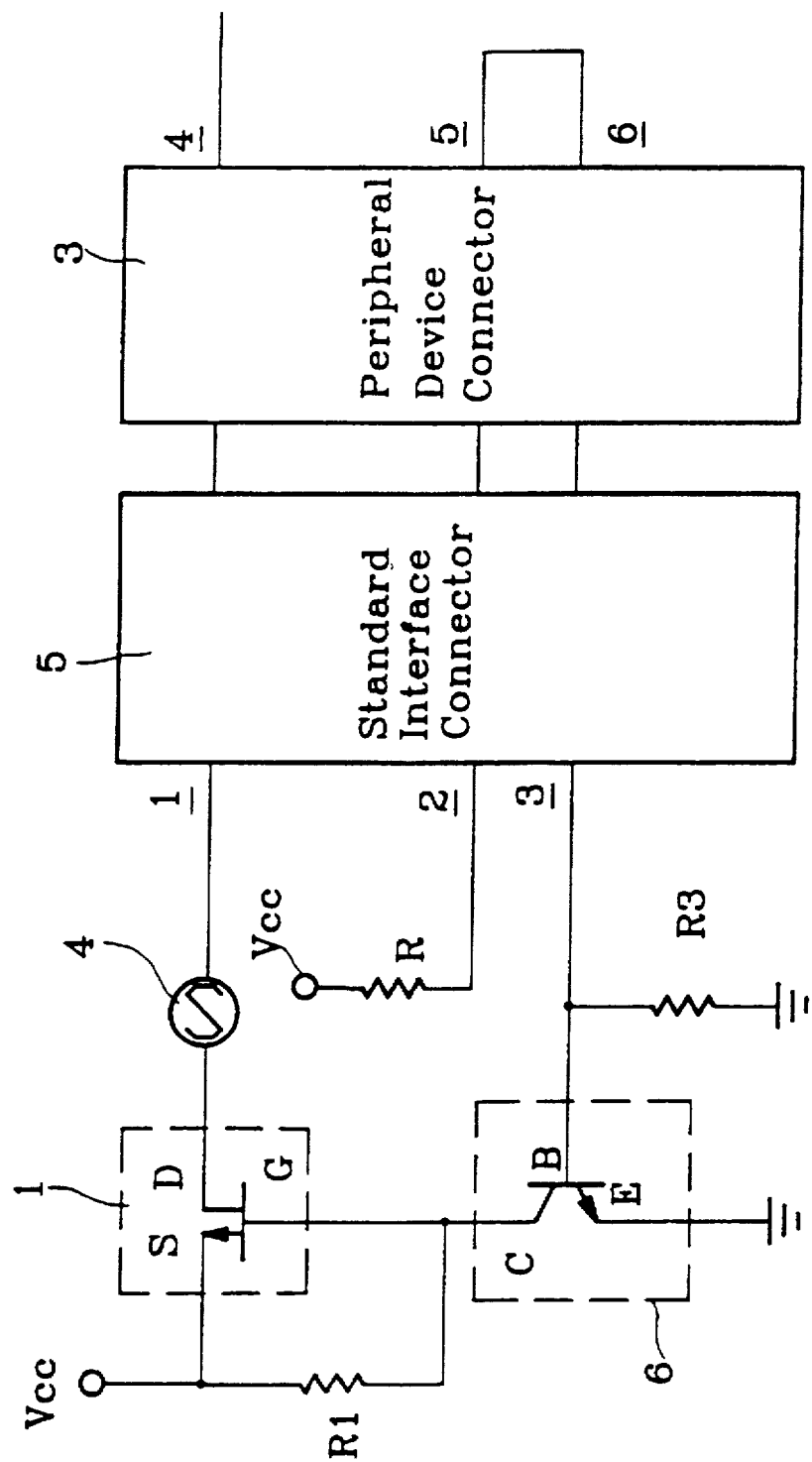
FIG. 2 is an alternative embodiment of the invention comprising two electronic switching devices and a standard interface connector.

FIG. 2 shows an alternative embodiment of this invention comprising a standard interface connector. The computer system can provide power to a peripheral device through a standard interface connector 5, such as a printer port or an RS-232 I/O port. In this embodiment, a printer port is used as the interface connector to provide system power through three pins that have been defined as ground lines for the peripheral device 3. The printer port has 25 pins. Eight of them have been defined as ground lines. Three of the eight pins are used for the device of supplying power in this invention.

As shown in FIG. 2, the system power supply Vcc is connected to the source S of a first switching device 1 P-MOSFET. The gate G of the P-MOSFET is first connected to the collector of a second switching device 6 and then connected to Vcc through a resistor R1. The drain D of the P-MOSFET is connected to pin 1 of the standard interface connector through a fuse 4. The system power supply Vcc is also connected to a resister R2 that has high resistance and then to pin 2 of the standard interface connector. The second switching device 6 of this invention can be a transistor. The transistor has its base connected to pin 3 of the standard interface connector and its emitter connected to the ground. A resistor R3 connects the base and the emitter.

Pins 2 and pin 3 are the control lines of the power supply device. The state of the second switching device is controlled by pin 2 and pin 3. Furthermore, the state of the first switching device is controlled by the second switching device. The connector on the peripheral device 3 has pins 4, 5 and 6 corresponding to pins 1, 2 and 3 of the standard interface connector respectively. Pin 4 is the power input to the peripheral device. Pin 5 and pin 6 are connected together.

When the computer is powered on and a peripheral device is not connected to the standard interface connector, the state of the transistor is OFF because on voltage difference exists between its base B and its emitter E. The gate G of the P-MOSFET has high voltage in that it is connected to Vcc through R1. Therefore, the P-MOSFET is OFF and no system power is supplied through the P-MOSFET to pin 1 of the standard interface connector. When the peripheral device is connected, pin 2 and pin 3 becomes connected together. The resistors R2 and R3 are chosen such that the voltage level at the base of the transistor is high enough to saturate the transistor. The transistor is in an ON state. The saturation voltage between the collector and the emitter is about 0.2 volts. The gate G of the P-MOSFET is at the same low voltage to set the P-MOSFET in an ON state. Therefore, current flows from the source S to the drain D and provides power to the peripheral device.

The fuse 4 protects the system from being damaged when pin 1 is accidentally shorted to the ground or any other abnormal operation occurs. In addition, because pin 2 is connected to Vcc through a resistor R2, the system power supply will have limited current going out due to the high resistance of R2 even if pin 2 is shorted to the ground.

Figure 3:
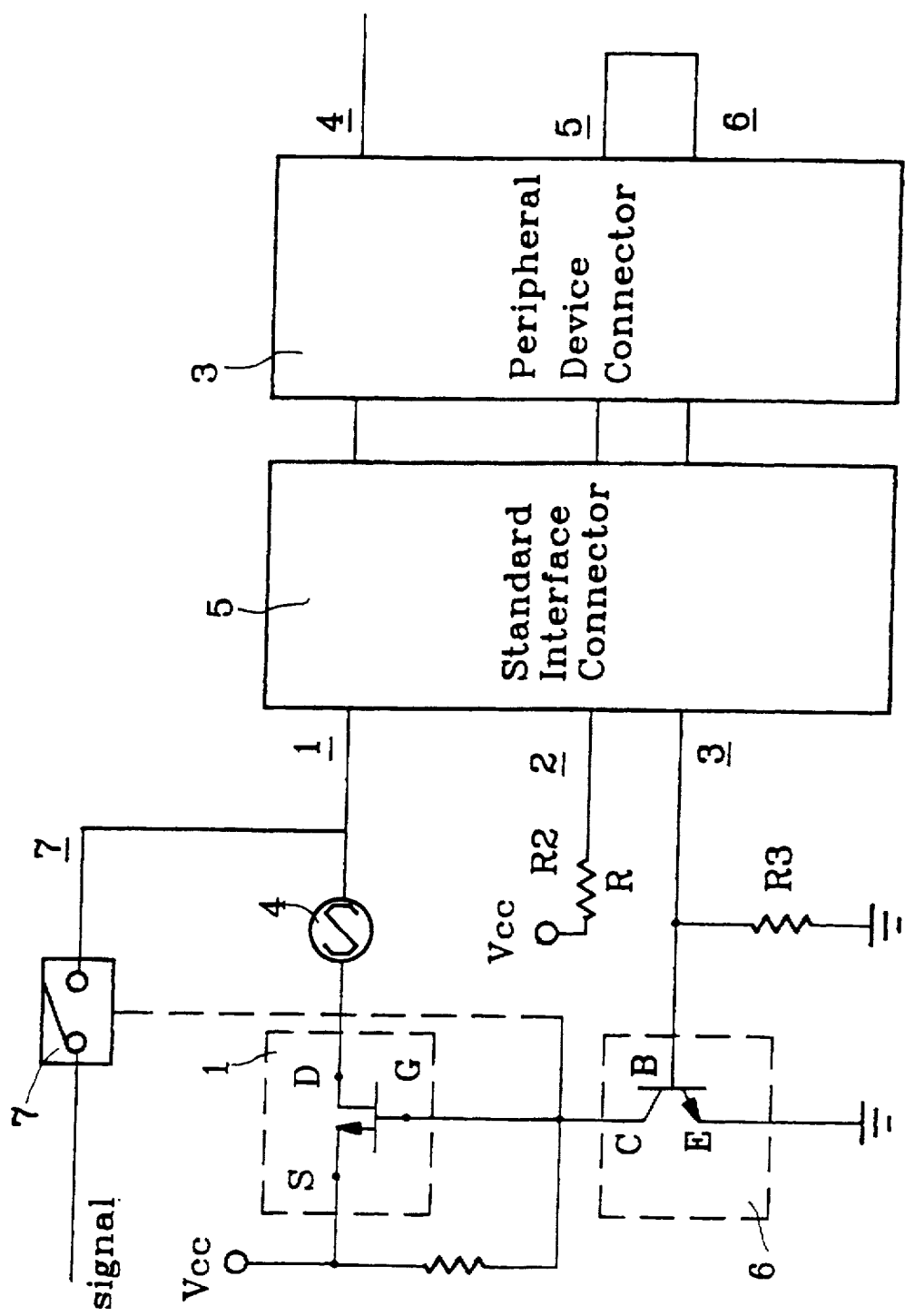
FIG. 3 is another preferred embodiment of the invention comprising two electronic switching devices, an electronic multiplexer switch and a standard interface connector.

Another embodiment of this invention is illustrated in FIG. 3. The power supply circuit in this embodiment is similar to that of FIG. 2 except that a signal line is used for supplying power to the peripheral device. Because of the fact that the signal line also has to transmit signal, an electronic multiplexer switch 7 needs to be connected to the gate G of the P-MOSFET. When a peripheral device connector 3 is connected to the interface connector 5, the low voltage at the gate G not only saturates the P-MOSFET to supply the power as described before but also turns on the electronic multiplexer switch 7. The signal can, therefore, be transmitted through pin 7 of the interface connector to the peripheral device for an input or output operation.

As shown above, the invention uses existing pins on an interface connector for supplying system power to a peripheral device. Different peripheral devices may use different interface connectors and configure pins on the interface connectors based on their specific need. This invention can be applied according to the specific configuration of the peripheral device to properly select interface connector pins for providing power to the peripheral device from the system power supply.

The priority of pins to be selected should be unused pins first and then the available pins being configured as ground lines. When those pins are not available, the pins for signal lines may be used as shown in the last embodiment disclosed above. In general, the expansion interface connector has unused pins and the parallel I/O port, such as printer port, has additional pins configured as ground lines. They should be selected for use in the present invention. However, when the interface connector is a serial port, such as RS-232 port, the use of a signal pin is necessary because no other pin is available.

Although only the preferred embodiments of this invention were shown and described in the above description, it is requested that any modification or combination that comes within the spirit of this invention be protected.

What is claimed is:

1. An apparatus for supplying power from a computer system through a standard interface connector to an externally connected peripheral device, comprising:

an electronic switching device having a voltage input terminal connected to a system power supply output of said computer system, a control input terminal connected to said system power supply output through a resistor, and a voltage output terminal;

a fuse having a first end connected to said voltage output terminal;

first, second and third pins of said standard interface connector, said first pin being connected to a second end of said fuse, said second pin being connected to said control input, said third pin being connected to ground of said computer system, and said first, second and third pins being unused or ground pins in a standard interface configuration;

and a peripheral device connector coupled to said standard interface connector, said peripheral device connector having a first connection means corresponding to said first pin, a second connection means corresponding to said second pin and a third connection means corresponding to said third pin, said second connection means and said third connection means being connected together;

wherein said electronic switching device is turned on and said system power supply output provides voltage power through said first pin to said externally connected peripheral device when said peripheral device connector is connected to said standard interface connector, and said electronic switching device is turned off and no voltage power exists on said first pin of said standard interface connector when said peripheral device connector is not connected.

2. The apparatus for supplying power from a computer system through a standard interface connector to an externally connected peripheral device according to claim 1, said electronic switching device being a P-MOSFET.

3. The apparatus for supplying power from a computer system through a standard interface connector to an externally connected peripheral device according to claim 1, said standard interface connector being a parallel port.

4. The apparatus for supplying power from a computer system through a standard interface connector to an externally connected peripheral device according to claim 1, said standard interface connector being a serial port.

5. An apparatus for supplying power from a computer system through a standard interface connector to an externally connected peripheral device, comprising:

a first electronic switching device having a voltage input terminal connected to a system power supply output of said computer system, a control input terminal connected to said system power supply output through a first resistor, and a voltage output terminal;

a fuse having a first end connected to said voltage output terminal;

a second electronic switching device having a first terminal connected to said control input terminal, a second terminal connected to ground of said computer system, and a third terminal connected to said ground through a second resistor;

first, second and third pins of said standard interface connector, said first pin being connected to a second end of said fuse, said second pin being connected to said system power supply output through a third resistor, said third pin connected to said third terminal of said second electronic switching device, and said first, second and third pins being unused or ground pins in a standard interface configuration;

and a peripheral device connector coupled to said standard interface connector, said peripheral device connector having a first connection means corresponding to said first pin, a second connection means corresponding to said second pin and a third connection means corresponding to said third pin, said second connection means and said third connection means being connected together;

wherein said first electronic switching device and said second electronic switching device are turned on and said system power supply output provides voltage power through said first pin to said externally connected peripheral device when said peripheral device connector is connected to said standard interface connector, and said first electronic switching device and said second electronic switching device are turned off and no voltage power exists on said first pin of said standard interface connector when said peripheral device connector is not connected.

6. The apparatus for supplying power from a computer system through a standard interface connector to an externally connected peripheral device according to claim 5, said first electronic switching device being a P-MOSFET and said second electronic switching device being a transistor.

7. The apparatus for supplying power from a computer system through a standard interface connector to an externally connected peripheral device according to claim 5, said standard interface connector being a parallel port.

8. The apparatus for supplying power from a computer system through a standard interface connector to an externally connected peripheral device according to claim 5, said standard interface connector being a serial port.

9. The apparatus for supplying power from a computer system through a standard interface connector to an externally connected peripheral device according to claim 5, further comprising an electronic multiplexer switch having a control line connected to said control input terminal of said first electronic switching device, said electronic multiplexer switch transmitting a signal of said computer system only if said first electronic switching device is turned off.

10. The apparatus for supplying power from a computer system through a standard interface connector to an externally connected peripheral device according to claim 9, said standard interface connector being a serial port.

* * * * *